(12) United States Patent
Hörnkvist et al.

(10) Patent No.: US 9,020,951 B2
(45) Date of Patent: *Apr. 28, 2015

(54) METHODS FOR INDEXING AND SEARCHING BASED ON LANGUAGE LOCALE

(75) Inventors: John M. Hörnkvist, Cupertino, CA (US); Eric R. Koebler, Aptos, CA (US)

(73) Assignee: Apple Inc., Cupertino, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/615,484

(22) Filed: Sep. 13, 2012

(65) Prior Publication Data

US 2013/0073559 A1 Mar. 21, 2013

Related U.S. Application Data

(63) Continuation of application No. 12/913,517, filed on Oct. 27, 2010, now Pat. No. 8,577,891.

(51) Int. Cl.
*G06F 7/00* (2006.01)
*G06F 17/30* (2006.01)

(52) U.S. Cl.
CPC .... *G06F 17/30622* (2013.01); *G06F 17/30672* (2013.01)

(58) Field of Classification Search
None
See application file for complete search history.

(56) References Cited

U.S. PATENT DOCUMENTS

| 6,047,283 | A | 4/2000 | Braun |
|---|---|---|---|
| 2005/0060651 | A1 | 3/2005 | Anderson |
| 2005/0228791 | A1 | 10/2005 | Thusoo et al. |
| 2005/0251519 | A1 | 11/2005 | Davis |
| 2006/0004738 | A1 | 1/2006 | Blackwell et al. |
| 2006/0294100 | A1 | 12/2006 | Meyerzon et al. |
| 2007/0203929 | A1 | 8/2007 | Bolivar |
| 2009/0112845 | A1 | 4/2009 | Byers et al. |
| 2009/0125497 | A1 | 5/2009 | Jiang et al. |

FOREIGN PATENT DOCUMENTS

| GB | 2 331 816 A | 6/1999 |
|---|---|---|
| JP | 2002-092018 A | 3/2002 |
| JP | 2005-004626 A | 1/2005 |

OTHER PUBLICATIONS

International Preliminary Report on Patentability (Chapter 1), mailing date May 10, 2013, for corresponding International Application No. PCT/US2011/056963, 14 pages.

(Continued)

*Primary Examiner* — Apu Mofiz
*Assistant Examiner* — Thu Nga Nguyen
(74) *Attorney, Agent, or Firm* — Blakely, Sokoloff, Taylor & Zafman LLP

(57) ABSTRACT

In response to a search query having a search term received from a client, a current language locale is determined. A state machine is built based on the current language locale, where the state machine includes one or more nodes to represent variance of the search term having identical meaning of the search term. Each node of the state machine is traversed to identify one or more postings lists of an inverted index corresponding to each node of the state machine. One or more item identifiers obtained from the one or more postings list are returned to the client, where the item identifiers identify one or more files that contain the variance of the search term represented by the state machine.

33 Claims, 11 Drawing Sheets

(56) References Cited

OTHER PUBLICATIONS

Mark Davis and Ken Whistler, Unicode Collation Algorithm, Oct. 8, 2010.

Mark Davis and Ken Whistler, Unicode Locale Data Markup Language, Oct. 26, 2012.

PCT International Search Report and Written Opinion of the International Authority for PCT/US2011/056963, mailed May 9, 2012, 21 pages.

Gonzalo Navarro Ed—Baeza-Yates R. et al.: "Modern Information Retrieval, Chapter 8: Indexing and Searching", Jan. 1, 1999, Modern Information Retrieval, ACM Press, New York, pp. 191-228, XP002457291, ISBN: 978-0-201-39829-8, section 8.2.

Davis M. and Whistler K: "Unicode Collation Algorithm", Unicode Technical Standard #10, Oct. 8, 2010, XP002665206, retrieved from the Internet: URL: http://www.unicode.org/reports/tr10/tr10-22.html, [retrieved on Dec. 6, 2011] Sections 1 and 8.

Shinzato, et al, "Global Assessment on Progressive Language Processing in Web-Based Data Searching," The 14$^{th}$ Technical Paper issued by Language Processing Society of Japan, Mar. 17, 2008, pp. 99-102.

Search in Danish for "vår"

Search in Danish for "var"

METHODS FOR INDEXING AND SEARCHING BASED ON LANGUAGE LOCALE

This application is a continuation of U.S. patent application Ser. No. 12/913,517 filed on Oct. 27, 2010, now U.S. Pat. No. 8,577,891.

FIELD OF THE INVENTION

Embodiments of the invention relate generally to the field of indexing and searching of data; and more particularly, to indexing and searching based on language locale.

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's Photoshop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe Photoshop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears.

Some locales respond differently to special characters. For example, in U.S., the 'a' character should generate 'a', 'å', and 'à', and some other characters, as they have similar meaning or identical meaning based on their base characters. By contrast, in a Swedish locale, these characters may have different meanings. Conventional indexing and searching have not taken into account the specific language locale.

SUMMARY OF THE DESCRIPTION

According to one aspect of the invention, in response to a search query having a search term received from a client, a current language locale is determined. A state machine is built based on the current language locale, where the state machine includes one or more nodes to represent variance of the search term having identical meaning of the search term. Each node of the state machine is traversed to identify one or more postings lists of an inverted index corresponding to each node of the state machine. One or more item identifiers obtained from the one or more postings list are returned to the client, where an item identifier may identify one or more entries or locations of one or more files that contain the variance of the search term represented by the state machine.

According to another aspect of the invention, in response to a search query having a search term, a collation key is determined for each part of the search term. A state machine having one or more nodes is built based on the search term, each node representing one of characters in the search term. Each of the nodes in the state machine is traversed to identify one or more postings lists of an inverted index corresponding to each node of the state machine. For each node of the state machine, one or more equivalent characters having an identical meaning are identified based on a current language locale. Collation keys of the equivalent characters are compared with a key or keys of the corresponding character or characters in the search term. An equivalent character having a collation key that does not match the collation key of the corresponding character in the search term is removed, where remaining characters are used to identify the one or more postings lists in the inverted index.

According to a further aspect of the invention, a first term at a data processing system is received, where the first term includes one or more characters to be indexed. A current language locale of the data processing system is determined. A collation key for each of the characters of the first term is determined under the current language locale. The collation key for each of the characters of the first term is indexed in an inverted index without indexing based on actual characters of the first term. The collation key represents a family of one or more equivalent characters having an identical meaning under the current language locale, where the inverted index is used for subsequent searches based on collation keys.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiment, an index (e.g., inverted index) can be built differently based on the kind of language locales used. In one embodiment, an index is built to cover most or all of the characters (including the special characters) of most or all language locales during the indexing phase. Subsequently, when a search query is received for searching any file that contains a search term of the search query, a state machine is dynamically built based on the language locale at the point in time, where the state machine represents all variance of search terms under the language locale that have the identical or similar meaning. This in effect, screens out any characters having a different meaning under the language locale at the point in time, but otherwise may have the same meaning in other language locales.

According to an alternatively embodiment, for some operating environments such as mobile devices, since the localization tends to remain static (e.g., language locale remains the same for a relatively long period of time), the index may be built in a language specific manner. For example, if multiple characters or query terms are equivalent, instead of indexing the actual characters or terms, a collation key corresponding to the characters or terms is indexed. As a result, the index can be maintained in a relatively small size, which in turn results in faster searching.

Figure 1:
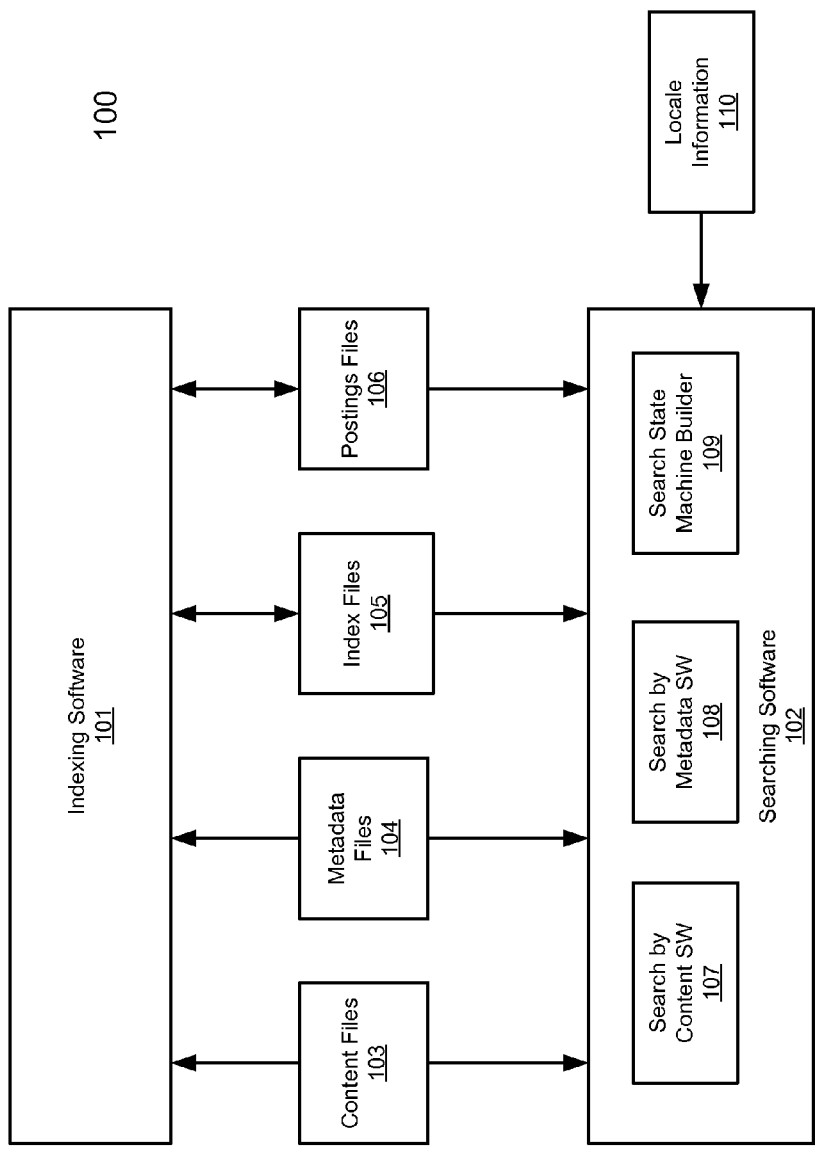
FIG. 1 is a block diagram illustrating an indexing and searching system according to one embodiment of the invention.

FIG. 1 is a block diagram illustrating an indexing and searching system according to one embodiment of the invention. Referring to FIG. 1, system 100 includes, but is not limited to, indexing software 101, searching software 102, and one or more system components such as a kernel of an operating system (OS), which is operatively coupled to the indexing software 102 and searching software 102, as well as other software programs. Searching software 102 includes a variety of searching programs such as search by content (also referred to as find by content) software 107, search by metadata (also referred to as find by metadata) software 108. For example, search by content software 107 and/or search by metadata software 108 may be implemented as part of a browsing program of any kind of operating systems, such as Finder™ program of Mac OS™ available from Apple Inc. of Cupertino, Calif.

In one embodiment, the find by content software 107 and/or the find by metadata software 108 is used to find a term present in content files 103 or metadata 104. For example, the software 107/108 may be used to find text and other information from word processing or text processing files created by word processing programs such as Microsoft Word, etc.

Find by content software 107 and find by metadata software 108 are operatively coupled to databases which include one or more indexes 105. The indexes 105 represent at least a subset of the data files in a storage device, including file data 103 and metadata 104, and may include all of the data files in a particular storage device (or several storage devices), such as the main hard drive of a computer system. The one or more indexes 105 include an indexed representation of the content and/or metadata of each item stored on files 103/104, such as a text document, music, video, or other type of file. The find by content software 107 searches for a term in that content by searching through the one or more index files 105 to determine if the particular term, e.g., a particular word, is present in items stored on data files 103 which have been indexed. The find by content software functionality is available through find by metadata software 108 which provides the advantage to the user that the user can search the indexes 105 for the content 103 within an item stored on the data files 103 as well as any metadata 108 that may have been generated for the item.

In one embodiment of the invention, indexing software 101 is used to create and maintain the one or more indexes 105 that are operatively coupled to the find by content and metadata software applications 107/108. Among other functions, the indexing software 101 receives information obtained by scanning the content files 103 and metadata 104, and uses that information to generate one or more postings lists 106 that identifies an item (e.g., file) containing a particular term, or having metadata containing a particular term. As such, a postings list is a type of inverted index that maps a term, such as a search term, to the items identified in the list.

In one embodiment, the information obtained during the scan includes a unique identifier that uniquely identifies an item containing the particular term, or having metadata containing the term. For example, items such as a word processing or text processing file have unique identifiers, referred to as ITEMIDs. The ITEMIDs are used when generating a postings list (e.g., postings files 106) to identify those items that contain a particular term, such as the word "Apple." ITEMIDs identifying other types of files, such as image files or music files, may also be posted to one or more postings lists 106, in which case the ITEMID typically identifies items having metadata containing a particular term. In one embodiment, the indexing software 101 accumulates postings lists 106 for one or more terms into one or more update sets (not shown) and, from time to time, flushes the updates sets into one or more index files 105.

In one embodiment, search software 102 further includes a search state machine builder 109 configured to build a state machine at the searching time based on language locale information 110, which may have been configured as a part of an operating system, or system/user configuration. In one embodiment, when a search query is received to search any content files or metadata that contain a search term, state machine builder 109 is configured to dynamically build a state machine to represent the search term based on a current language locale obtained from locale information 110. The state machine may include one or more nodes, each representing a character or an equivalent character of the search term under the current language locale. That is, the state machine represents all variance of search terms under the language locale that have the identical or similar meaning. This in effect, screens out any characters having a different meaning under the language locale at the point in time, but otherwise may have the same meaning in other language locales.

For example, in English, the terms of "var", "vår", and "vàr" are equivalent and they have the identical meaning. When a search term includes one of the terms of "var", "vår", and "vàr" and the language locale is English, all files that contain any one of exact terms and an equivalent term (e.g., "var", "vår", and "vàr") should be searched and identified. However, in Swedish, the word "var" means "was" while the word "vår" means "spring". A search of "var" should not turn out a file that contains the term of "vår", or vice versa, as these two terms in Swedish have different meaning.

Figure 2:
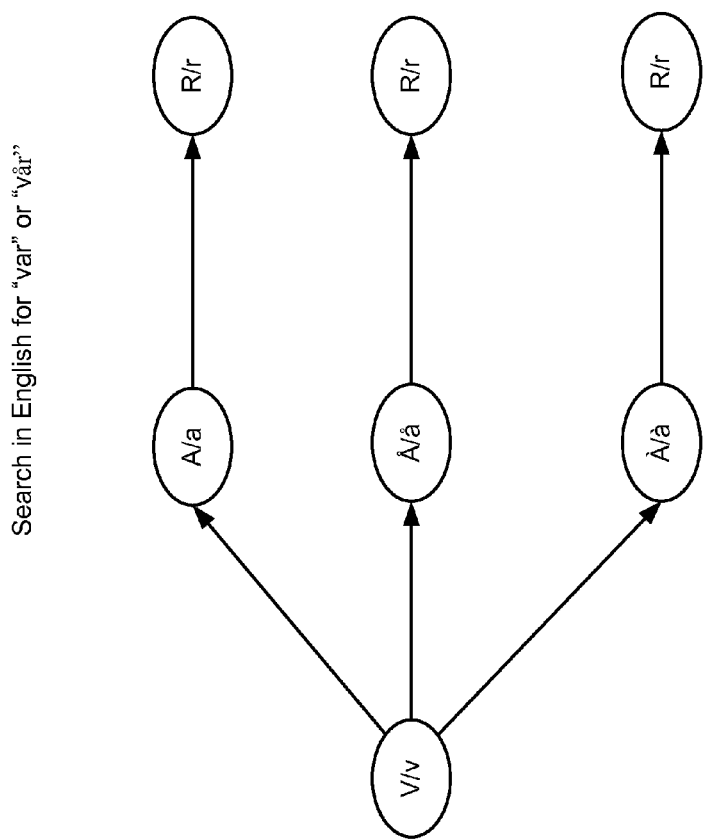
FIGS. 2-4 are state diagrams illustrating certain state machines according to some embodiments of the invention.

In one embodiment, a state machine is dynamically built based on the current language locale to represent the valid equivalent terms under the current language locale. For example, as shown in FIG. 2, in English locale, when a search term includes one of "var" and "vår", all files that contain one or more of "var", "vår", and "vàr", either as content data or metadata, should be searched and identified. In this example, it is assumed that the search is a case insensitive search. In response to the search term (e.g., either "var" or "vår"), a state machine is built which results in three terms having identical or similar meaning under the English locale. The state machine as shown in FIG. 2 can then be used to search for any postings lists corresponding to the terms represented by the state machine, in this example, terms of "var", "vår", and "vàr".

Figure 3:
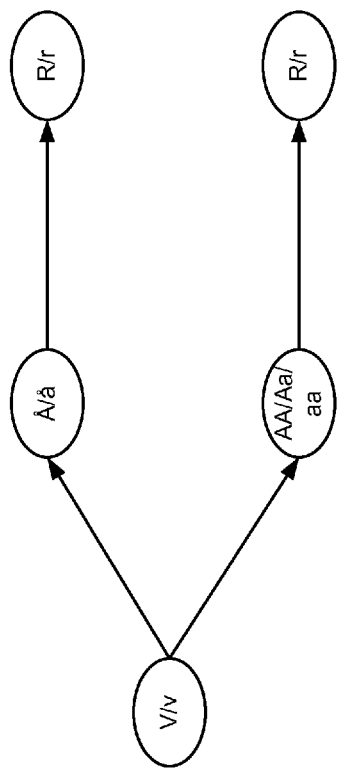
Figure 4:
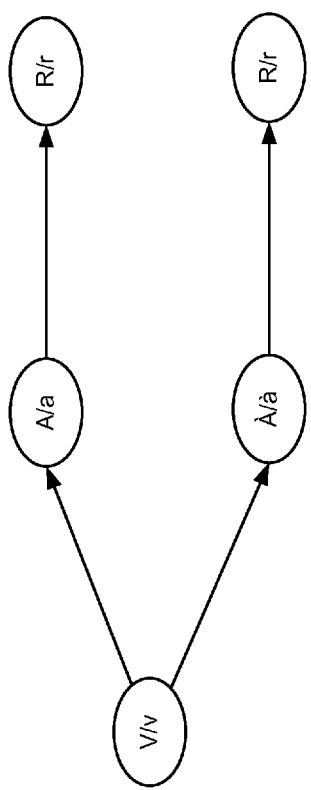

On the other hand, in Danish locale, searching for terms of "var" and "vår" could yield different results, as the terms of "var" and "vår" have different meaning in Danish. The term of "vår" in Danish may yield a state machine as shown in FIG. 3, while the term of "var" may yield a state machine as shown in FIG. 4, where in Danish the terms "var" and "vàr" are equivalent. Thus, in this example, searching for a term such as "var" could yield significantly different results dependent upon the language locale at the point in time. By using a state machine that is dynamically created at the point in time of the searching, the search result can be more specifically tailored to the current language locale.

Figure 5:
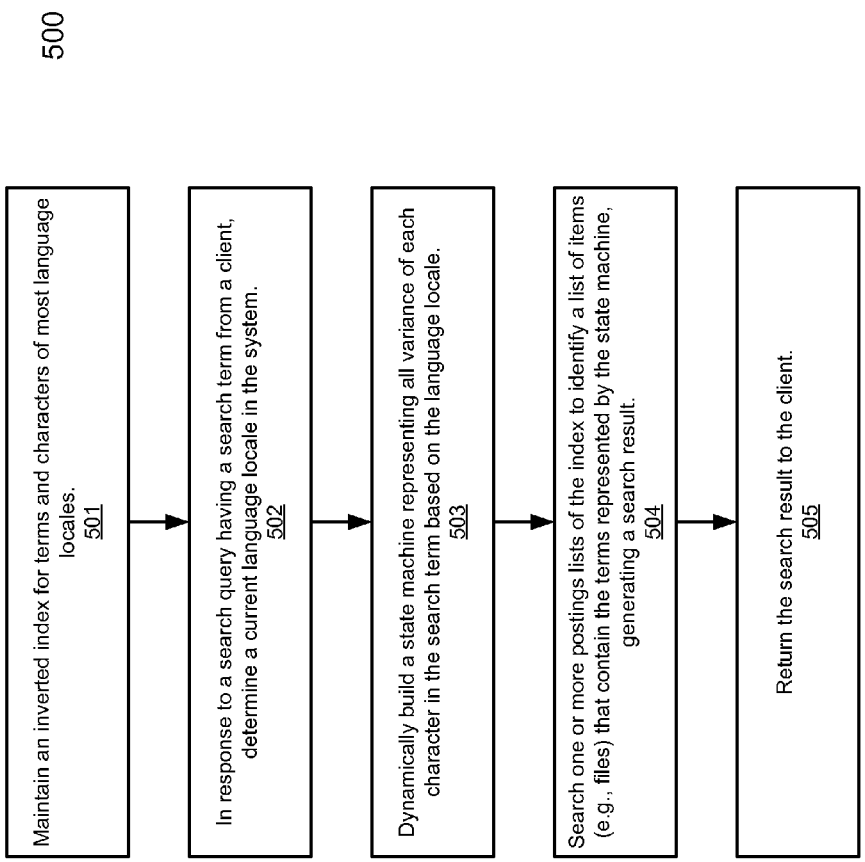
FIG. 5 is a flow diagram illustrating a method for indexing and searching based on the language locale according to one embodiment of the invention.

FIG. 5 is a flow diagram illustrating a method for indexing and searching based on the language locale according to one embodiment of the invention. For example, method 500 may be performed by system 100 of FIG. 1. Referring to FIG. 5, at block 501, an inverted index is maintained for terms and characters of all or most of the language locales. In response to a search query having a search term received from a client, it is determined a current language locale at the point in time. Based on the current language locale, at block 503, a state machine is dynamically built to represent all variance of each character (e.g., equivalent characters) in the search term. That is, the state machine represents all combinations or mutations of all various equivalent characters of the search terms under the current language locale. At block 504, the postings lists of the index are searched based on the terms represented by nodes of the state machine to identify a list of items (e.g., files) that contain one or more terms represented by the state machine, generating a search result. At block 505, the search result is returned to the client.

Referring back to FIG. 1, according to some embodiments, index files 105 and/or postings list files 106 may be stored in a tree structure such as a trie data structure or a flattened structure. A trie is a tree structure in which each node of the tree resolves one character of the string being matched. Each internal node consists of a list of characters. Associated with each character is an outgoing link either to another internal node or to a leaf node. Each leaf node holds the result data associated with the prefix leading to that leaf node. To search the trie, one starts at the root node and traverses the tree by following the outgoing link at each node corresponding to the next character in the string to be matched. When no matching outgoing link can be found, the matching has been found.

Each character may be represented by its Unicode and/or the corresponding collation key. For example, such Unicode and the collation key may be defined by the International Components for Unicode (ICU) governing body. A character may be stored in a composed form represented by a single Unicode or a decomposed form which may be represented by multiple Unicodes. In one embodiment, a character is stored as a variable-length character encoding for Unicode, such as a 8-bit Unicode Transformation Format (UTF-8) character.

Figure 6:
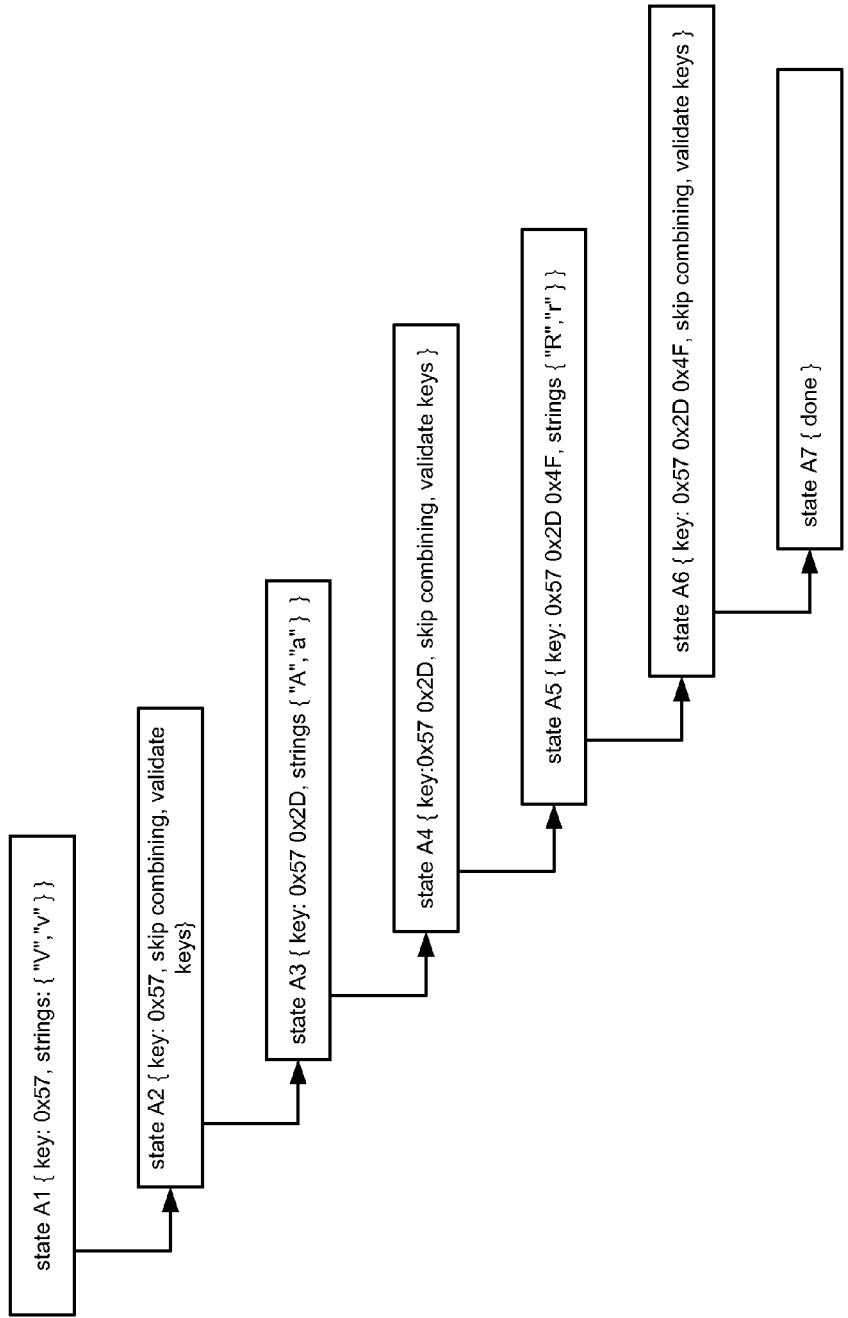
FIGS. 6 and 7 are diagrams illustrating a state machine based on collation keys according to some embodiments of the invention.
Figure 7:
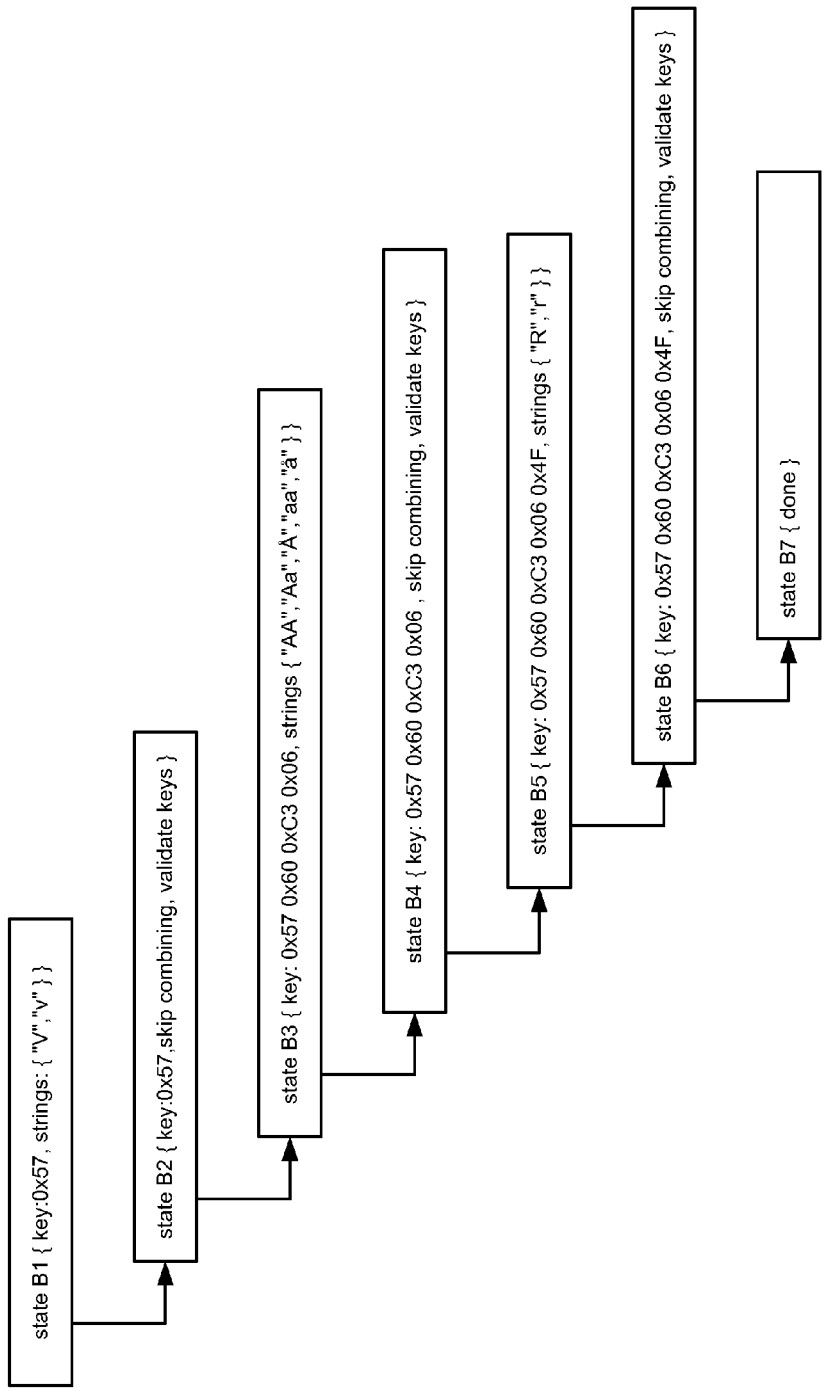

FIGS. 6 and 7 are diagrams illustrating a state machine based on collation keys according to some embodiments of the invention. In this example, the state machine as shown in FIG. 6 can be used to search the terms of "var" and "vår" in the English locale or "var" in the Danish locale with collation keys of 0x57, 0x2D, 0x4F, respectively. Note that a collation key is determined based on each part of a term in a given language locale. For example, in English, the term of "vaar" has a collation key of (0x57 0x23 0x23 0x4F), where the part of "v" is represented by the key of "0x57"; the part of "aa" is represented by the key of "0x23 0x23"; and the part of "r" is represented by the key of "0x4F). However, in Danish, the term of "vaar" has a collation key of (0x57 0x60 0xC3 0x06 0x4F), where the part of "v" is represented by the key of "0x57"; the part of "aa" is represented by the key of "0x60 0xC3 0x06"; and the part of "r" is represented by the key of "0x4F). The state machine as shown in FIG. 7 can be used to search the term of "vår" in the Danish locale. As described above, the state machines as shown in FIGS. 6 and 7 can be dynamically built based on the current language locale in response to a search term.

Figure 8:
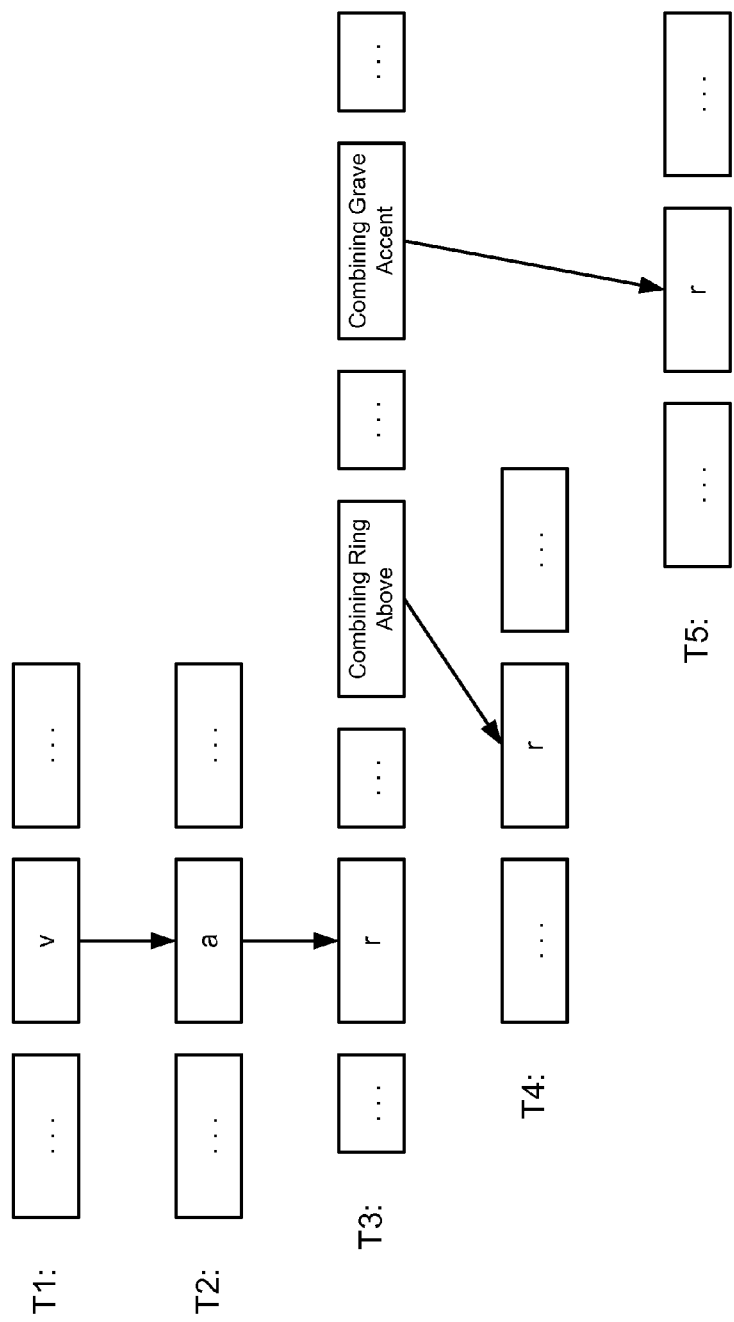
FIGS. 8 and 9 are diagrams illustrating certain data structures according to some embodiments of the invention.
Figure 9:
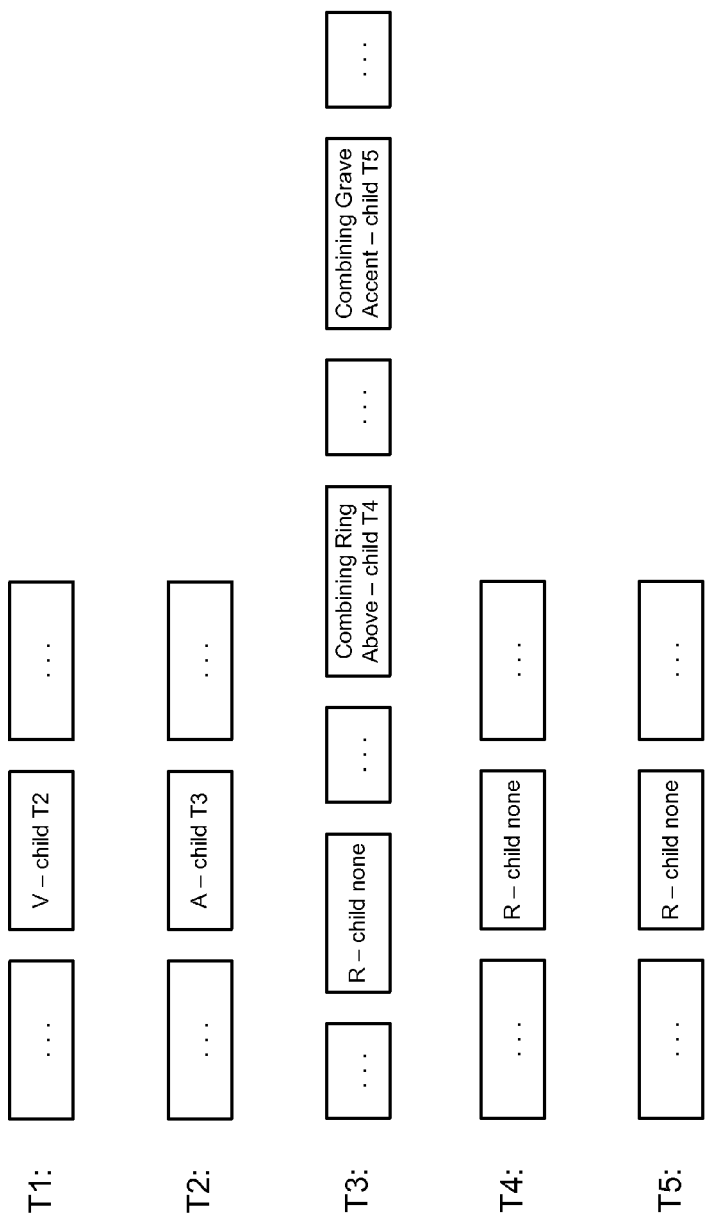

In this example, it is assumed that a search of "var" is received in the English locale and the state machine as shown in FIG. 6 is dynamically created, where the characters are stored in a trie architecture as shown in FIG. 8 or a flattened form as shown in FIG. 9. The processing logic (e.g., searching software) starts with state A1 of FIG. 6, where the match information stored in a variable match_info is empty. Referring to FIG. 6, at state A1, processing logic looks for matching strings and finds "v", and match_info={"v" next=T2}. The processing logic then transitions to state A2. At state A2, processing logic looks for any following combining characters and cannot find any, where match_info={"v" next=T2}. It then transitions to state A3. At state A3, processing logic looks for matching strings and finds "a", and match_info={"va" next=T3}. It then transitions to state A4.

At state A4, processing logic looks for any following combining characters and finds "å" and "a". Thus match_info={"va" next=T3, "vå" next=T4, "và" next=T5}. The processing logic then validates the associated collation keys {s:"va" k:0x57 0x2D, s:"vå" k: 0x57 0x2D, s:"và" k:

0x57 0x2D}. In this example, all collation keys are matched with collation keys of 0x57, 0x2D, 0x4F. At this point, match_info={"va" next=T3, "vå" next=T4, "và" next=T5} and the processing logic transitions to state A5. At state A5, processing logic looks for matching strings and finds "r". The match_info={var" next=0, "vår", next=0, "và" next=0}. It then transitions to state A6. At state A6, processing logic looks for any following combining characters and cannot find any. At this point, the match_info={"var" next=0, "vår", next=0, "và" next=0}. Processing logic then transitions to state A7 and has the final match for "var","vår" and "vàr". The postings lists of these terms can then be identified and retrieved from any one of the data structures as shown in FIGS. 8-9.

In another example of searching in Danish for "vår", referring to FIG. 7, the processing logic starts at state B1 with match_info={empty}. At state B1, processing logic looks for matching strings and finds "v", where match_info={"v" next=T2}. At state B2, processing logic looks for any following combining characters and cannot find any, where match_info={"v" next=T2}. At state B3, processing logic looks for matching strings and finds "å", where match_info={"vå" next=T4}. At state B4, processing logic looks for any following combining characters and cannot find any, where match_info={"vå" next=T4}. At state B5, processing logic looks for matching strings and finds "r", where match_info={"vår" next=0}. At state B6, processing logic looks for any following combining characters and cannot find any, where match_info={"vår" next=0}. At state B7, we have the final match for "vår."

In searching in Danish for "var", processing logic starts at state A1 with match_info {empty}. At state A1, processing logic looks for matching strings and finds "v", where match_info={"v" next=T2}. At state A2, processing logic looks for any following combining characters and cannot find any, where match_info={"v" next=2}. At state A3, processing logic looks for matching strings and finds "a", where match_info={"va" next=T3}. At state A4, processing logic looks for any following combining characters and finds some, where match_info={"va" next=T3, "vå" next=T4, "và" next=T5}. In addition, processing logic validates the collation keys {s:"va" k: 0x57 0x2D, s:"vå" k: 0x57 0x60 0xC3 0x06, s:"và" k: 0x57 0x2D}. In this example, only the collation keys of "va" and "và" (e.g., 0x60, 0xC3, and 0x06) match the one with the search term (e.g., 0x57 and 0x2D), where the collation key of "vå" does not match. Thus, match_info={"va" next=T3, "và" next=T5}, where "vå" is removed. At state A5, processing logic looks for matching strings and finds "r", where match_info={"var" next=0, "và" next=0}. At state A6, processing logic looks for any following combining characters and cannot find any, where match_info={"var" next=0, next=0, "và" next=0}. At state A7, we have the final match for "var" and "vàr."

Figure 10:
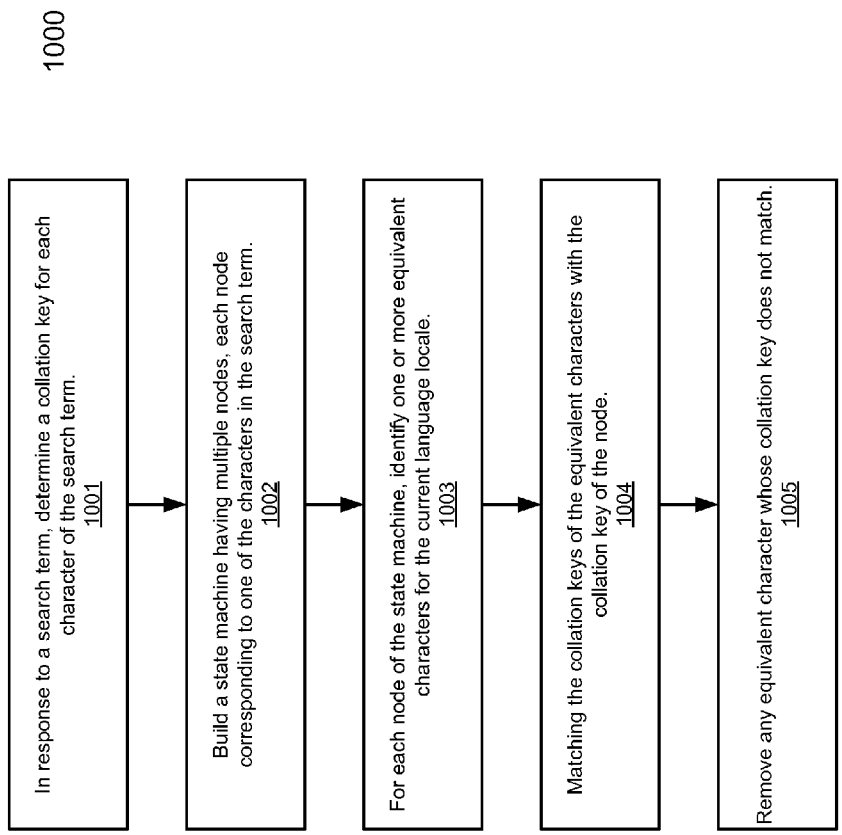
FIG. 10 is a flow diagram illustrating a method for searching according to another embodiment of the invention.

FIG. 10 is a flow diagram illustrating a method for searching according to another embodiment of the invention. For example, method 1000 may be performed by system 100 of FIG. 1. Referring to FIG. 10, at block 1001, in response to a search term, it is determined a collation key for each character of the search term. Such a collation key may be determined according to one or more rules set forth by the ICU governing body. At block 1002, a state machine is dynamically built, where the state machine includes one or more nodes, each corresponding to one of the characters of the search term. At block 1003, for each node in the state machine, one or more equivalent characters are identified based on the current language locale. At block 1004, collation keys of the equivalent characters are matched with the collation keys associated with the search term. At block 1005, any character whose collation key does not match with the corresponding one of the search term is removed.

For some operating environments such as a mobile device, language locale tends to be stable. That is, the language locale of the operating environment does not change often. Rather, the processing bandwidth such as memory and/or storage tends to be limited in such operating environments. According to some embodiments of the invention, instead of indexing actual characters of a term, collation keys of the characters of the term for the current language locale are indexed. For example, a mobile phone typically has a small set of documents that is being indexed. In one embodiment, the collation keys are indexed based on the current language locale. If the language locale changes, the collation keys of the documents under the new language locale are re-indexed.

For English, the terms of "var", "vår", and "vàr" all have the same collation key (0x57 0x2D 0x4F) for a case/diacritic insensitive search. In this situation, one can just index the collation key instead of the original term. When searching, a collation key is dynamically built based on the search term. This has the advantage of storing fewer unique terms, but it may loose the original term in the process (i.e., the original term cannot be regenerated from the collation key because a single collation key may represent multiple characters). However, the index could be maintained in a relatively small size.

Figure 11:
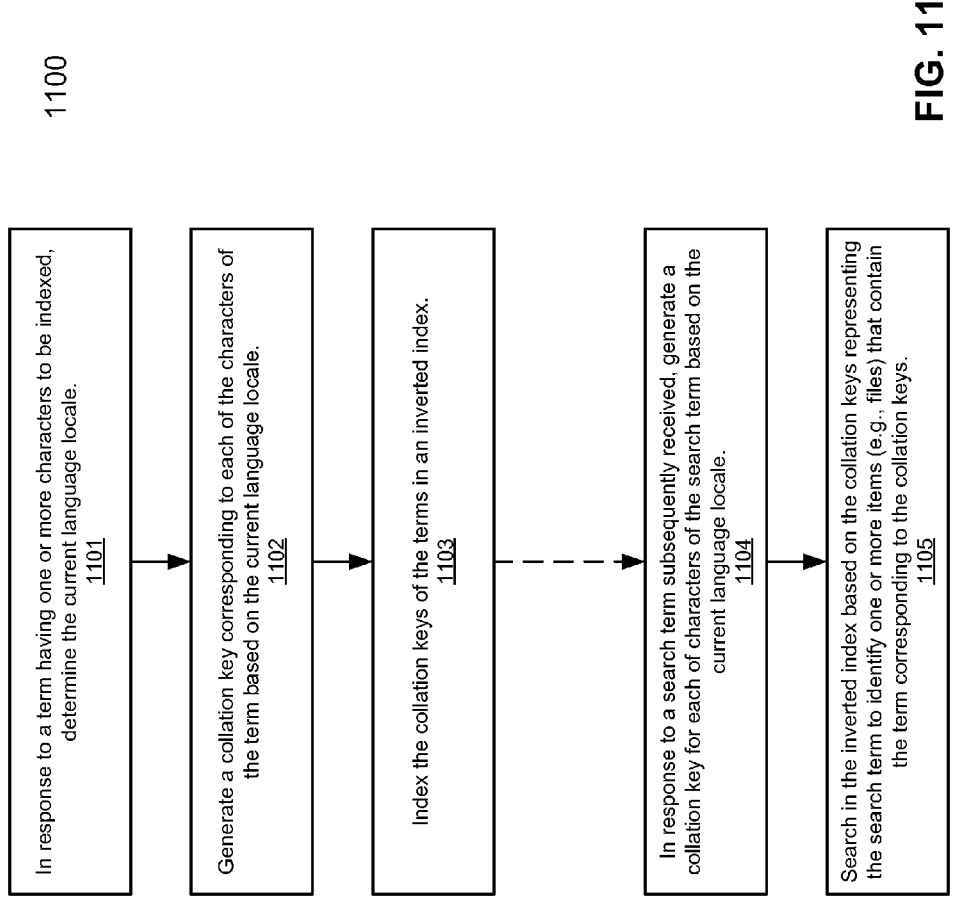
FIG. 11 is a flow diagram illustrating a method for indexing and searching based on collation keys according to one embodiment of the invention.

FIG. 11 is a flow diagram illustrating a method for indexing and searching based on collation keys according to one embodiment of the invention. For example, method 1100 may be performed by system 100 of FIG. 1. Referring to FIG. 11, at block 1101, in response to a term having one or more characters to be indexed, the current language locale is determined. The language locale may be obtained from a user and/or system configuration of an operating environment of the system. At block 1102, a collation key is generated for each or all of the characters in the term based on the current language locale. At block 1103, the collation keys representing the term are indexed in an inverted index. Subsequently, at block 1104, in response to a search term, a collation key for each of characters in the search term is generated based on the current language locale. At block 1105, the inverted index is searched based on the collation keys representing the search term to identify one or more files that contain the term corresponding to the collation keys. Note that operations involved in blocks 1101-1103 and blocks 1104-1105 may be performed independently, for example, through different threads.

Figure 12:
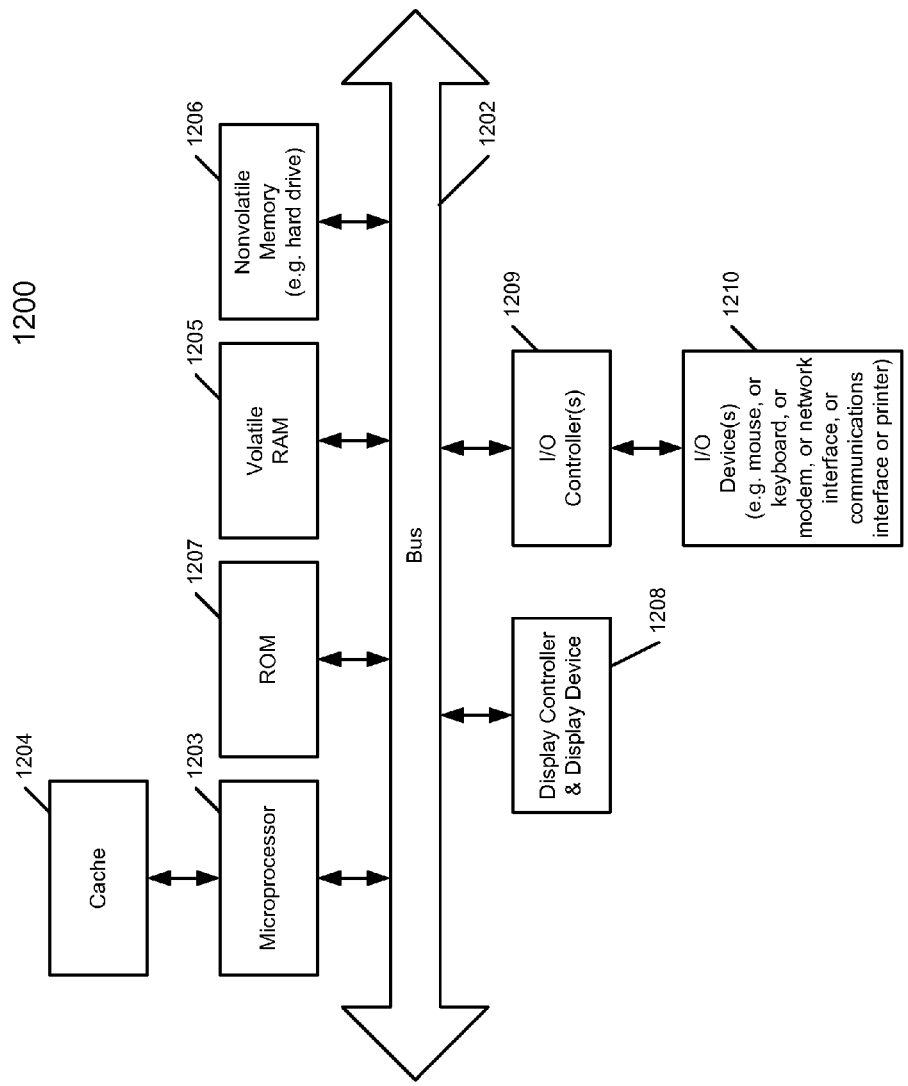
FIG. 12 is a block diagram of a data processing system, which may be used with one embodiment of the invention.

FIG. 12 is a block diagram of a data processing system, which may be used with one embodiment of the invention. For example, the system 1200 may be used as system 100 of FIG. 1. Note that while FIG. 12 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 12 may, for example, be an Apple Macintosh computer or MacBook, or an IBM compatible PC.

As shown in FIG. 12, the computer system 1200, which is a form of a data processing system, includes a bus or interconnect 1202 which is coupled to one or more microprocessors 1203 and a ROM 1207, a volatile RAM 1205, and a non-volatile memory 1206. The microprocessor 1203 is coupled to cache memory 1204. The bus 1202 interconnects these various components together and also interconnects these components 1203, 1207, 1205, and 1206 to a display controller and display device 1208, as well as to input/output (I/O) devices 1210, which may be mice, keyboards, modems, network interfaces, printers, and other devices which are well-known in the art.

Typically, the input/output devices 1210 are coupled to the system through input/output controllers 1209. The volatile RAM 1205 is typically implemented as dynamic RAM (DRAM) which requires power continuously in order to refresh or maintain the data in the memory. The non-volatile memory 1206 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 12 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1202 may include one or more buses connected to each other through various bridges, controllers, and/or adapters, as is well-known in the art. In one embodiment, the I/O controller 1209 includes a USB (Universal Serial Bus) adapter for controlling USB peripherals. Alternatively, I/O controller 1209 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   in response to a search query having a search term having a plurality of characters received from a client, determining a current language locale;
   building a data structure having a plurality of nodes to represent variance of the search term having identical meaning of the search term based on the current language locale, each of the nodes representing one of the characters in the search term, wherein the data structure includes at least two nodes corresponding to different characters that have an identical meaning under the current language locale;
   traversing each node of the data structure to identify one or more postings lists of an index corresponding to the plurality nodes of the data structure, wherein each node of the data structure is associated with a key presenting a collation of variance of different characters having an identical meaning in different language locales, wherein traversing the data structure comprises:
      matching a first key of each node of the data structure against a second key of a corresponding character of the search term,
      removing from the data structure a character candidate having a key that does not match the second key, and
      returning to the client one or more item identifiers obtained from the one or more postings list, the one or more item identifiers identifying one or more files that contain the variance of the search term represented by the data structure.

2. The method of claim 1, further comprising maintaining the index for a plurality of terms having the plurality of characters from a plurality of language locales, each term corresponding to the one or more postings list having the one or more item identifiers identifying one or more files that contain the corresponding term.

3. The method of claim 1, wherein each of the nodes in the data structure represents a character having the identical meaning of a corresponding character in the search term under the determined language locale.

4. The method of claim 1, wherein the key is derived from International Component Unicode (ICU) representing each of the characters in the different language locales.

5. The method of claim 1, wherein terms of the index are stored in a trie architecture, and wherein each node of the data structure is traversed to locate a corresponding node in the trie architecture in order to identify a corresponding the one or more postings list.

6. A non-transitory computer-readable storage medium having instructions stored therein, which when executed by a computer, cause the computer to perform a method, the method comprising:
   in response to a search query having a search term having a plurality of characters received from a client, determining a current language locale;
   building a data structure having a plurality of nodes to represent variance of the search term having identical meaning of the search term based on the current language locale, each of the nodes representing one of the characters in the search term, wherein the data structure includes at least two nodes corresponding to different characters that have an identical meaning under the current language locale;
   traversing each node of the data structure to identify one or more postings lists of an index corresponding to the plurality of nodes of the data structure, wherein each node of the data structure is associated with a key presenting a collation of variance of different characters having an identical meaning in different language locales, wherein traversing the data structure comprises:
      matching a first key of each node of the data structure against a second key of a corresponding character of the search term,
      removing from the data structure a character candidate having a key that does not match the second key, and
      returning to the client one or more item identifiers obtained from the one or more postings list, the one or more item identifiers identifying one or more files that contain the variance of the search term represented by the data structure.

7. The non-transitory computer-readable storage medium of claim 6, wherein the method further comprises maintaining the index for a plurality of terms having the plurality of characters from a plurality of language locales, each term corresponding to the one or more postings list having one or more item identifiers identifying one or more files that contain the corresponding term.

8. The non-transitory computer-readable storage medium of claim 6, wherein each of the nodes in the data structure represents a character having the identical meaning of a corresponding character in the search term under the determined language locale.

9. The non-transitory computer-readable storage medium of claim 6, wherein the key is derived from International Component Unicode (ICU) representing each of the characters in the different language locales.

10. The non-transitory computer-readable storage medium of claim 6, wherein terms of the index are stored in a trie architecture, and wherein each node of the data structure is traversed to locate a corresponding node in the trie architecture to identify a corresponding the one or more postings list.

11. A computer-implemented method, comprising:
   in response to a search query having a search term having a plurality of characters, determining a key for each character of the search term;
   building a data structure having a plurality of nodes based on the search term, each node representing one of characters in the search term, wherein the data structure includes at least two nodes corresponding to different characters that have an identical meaning under a current language locale; and
   traversing each of the nodes in the data structure to identify one or more postings lists of an index corresponding to the plurality of nodes of the data structure, including for each node of the data structure, identifying one or more equivalent characters based on the current language locale, wherein each node of the data structure is associated with a key presenting a collation of variance of different characters having an identical meaning in different language locales, wherein traversing each of the nodes in the data structure comprises:
      comparing keys of the equivalent characters with the key of the corresponding character in the search term,
      matching a first key of each node of the data structure against a second key of a corresponding character of the search term,
      removing an equivalent character having a key that does not match the key of the corresponding character in the search term, wherein remaining characters are used to identify the one or more postings lists in the index, and
      returning to the client one or more item identifiers obtained from the one or more postings list, the one or more item identifiers identifying one or more files that contain the variance of the search term represented by the data structure.

12. The method of claim 11, further comprising presenting to a client one or more item identifiers obtained from the one or more postings list, the item identifiers identifying one or more files that contain the variance of the search term represented by the data structure.

13. The method of claim 11, wherein a key is derived from International Component Unicode (ICU) representing a character in the different language locales.

14. A computer-implemented method for indexing, comprising:
   receiving a first search term at a data processing system, the first search term having a plurality of characters to be indexed;
   determining a current language locale of the data processing system;
   building a data structure having a plurality of nodes based on the first search term, each of the nodes representing one of the characters in the first search term, wherein the data structure includes at least two node corresponding to different characters that have an identical meaning under the current language locale;
   traversing each node of the data structure to identify one or more postings lists of an index corresponding to the plurality of nodes of the data structure; and
   determining a key for each of the characters of the first search term under the current language locale;
   indexing the key for each of the characters of the first search term in the index without indexing based on actual characters of the first search term, the key representing a family of a plurality of equivalent characters having an identical meaning under the current language locale, wherein the index is used for subsequent searches based on keys,
   wherein traversing the data structure comprises:
      matching a first key of each node of the data structure against a second key of a corresponding character of the search term,
      removing from the data structure a character candidate having the key that does not match the second key, and
      returning to the client one or more item identifiers obtained from the one or more postings list, the one or more item identifiers identifying one or more files that contain the variance of the search term represented by the data structure.

15. The method of claim 14, further comprising:
receiving at the data processing system a search query having a second term from a client, the second term having one or more characters;
generating a sequence of one or more keys representing each of the characters based on the current language locale;
searching the index based on the sequence of one or more keys to identify one or more postings lists associated with the keys; and
returning to the client a list of one or more item identifiers obtained from the postings lists, the one or more item identifiers identifying one or more files that contain characters corresponding to the keys.

16. The method of claim 14, wherein the key is derived from International Component Unicode (ICU) representing a character in the different language locales.

17. A data processing system, comprising:
a processor; and
a memory coupled to the processor for storing instructions, which when executed from the memory, cause the processor to perform operations, the operations including
in response to a search query having a search term having a plurality of characters received from a client, determining a current language locale;
building a data structure having a plurality of nodes to represent variance of the search term having identical meaning of the search term based on the current language locale, each of the nodes representing one of the characters in the search term, wherein the data structure includes at least two nodes corresponding to different characters that have an identical meaning under the current language locale; and
traversing each node of the data structure to identify one or more postings lists of an index corresponding to the plurality nodes of the data structure, wherein each node of the data structure is associated with a key presenting a collation of variance of different characters having an identical meaning in different language locales, wherein traversing the data structure comprises:
matching a first key of each node of the data structure against a second key of a corresponding character of the search term,
removing from the data structure a character candidate having a key that does not match the second key, and
returning to the client one or more item identifiers obtained from the one or more postings list, the one or more item identifiers identifying one or more files that contain the variance of the search term represented by the data structure.

18. The system of claim 17, wherein the operations further comprise maintaining the index for a plurality of terms having the plurality of characters from a plurality of language locales, each term corresponding to the one or more postings list having the one or more item identifiers identifying one or more files that contain the corresponding term.

19. The system of claim 17, wherein each of the nodes in the data structure represents a character having the identical meaning of a corresponding character in the search term under the determined language locale.

20. The system of claim 17, wherein the key is derived from International Component Unicode (ICU) representing each of the characters in the different language locales.

21. The system of claim 17, wherein terms of the index are stored in a trie architecture, and wherein each node of the data structure is traversed to locate a corresponding node in the trie architecture in order to identify a corresponding the one or more postings list.

22. A non-transitory machine-readable medium having instructions stored therein, which when executed by a processor, cause the processor to perform operations, the operations comprising:
in response to a search query having a search term having a plurality of characters, determining a key for each character of the search term;
building a data structure having a plurality of nodes based on the search term, each node representing one of characters in the search term, wherein the data structure includes at least two nodes corresponding to different characters that have an identical meaning under a current language locale; and
traversing each of the nodes in the data structure to identify one or more postings lists of an index corresponding to the plurality of nodes of the data structure, including for each node of the data structure, identifying one or more equivalent characters based on the current language locale, wherein each node of the data structure is associated with a key presenting a collation of variance of different characters having an identical meaning in different language locales, wherein traversing each of the nodes in the data structure comprises:
comparing keys of the equivalent characters with the key of the corresponding character in the search term,
matching a first key of each node of the data structure against a second key of a corresponding character of the search term,
removing an equivalent character having a key that does not match the key of the corresponding character in the search term, wherein remaining characters are used to identify the one or more postings lists in the index, and
returning to the client one or more item identifiers obtained from the one or more postings list, the one or more item identifiers identifying one or more files that contain the variance of the search term represented by the data structure.

23. The non-transitory machine-readable medium of claim 22, wherein the operations further comprise presenting to a client one or more item identifiers obtained from the one or more postings list, the item identifiers identifying one or more files that contain the variance of the search term represented by the data structure.

24. The non-transitory machine-readable medium of claim 22, wherein a key is derived from International Component Unicode (ICU) representing a character in the different language locales.

25. A data processing system, comprising:
a processor; and
a memory coupled to the processor to store instructions, which when executed from the memory, cause the processor to perform operations, the operations including
in response to a search query having a search term having a plurality of characters, determining a key for each character of the search term;
building a data structure having a plurality of nodes based on the search term, each node representing one of characters in the search term, wherein the data structure includes at least two nodes corresponding to different characters that have an identical meaning under a current language locale; and
traversing each of the nodes in the data structure to identify one or more postings lists of an index corresponding to the plurality of nodes of the data structure, including for each node of the data structure, identifying one or more equivalent characters based on the current language locale, wherein each node of the data structure is associated with a key presenting a collation of variance of different characters having an identical meaning in different language locales, wherein traversing each of the nodes in the data structure comprises:
comparing keys of the equivalent characters with the key of the corresponding character in the search term,
matching a first key of each node of the data structure against a second key of a corresponding character of the search term,
removing an equivalent character having a key that does not match the key of the corresponding character in the search term, wherein remaining characters are used to identify the one or more postings lists in the index, and
returning to the client one or more item identifiers obtained from the one or more postings list, the one or more item identifiers identifying one or more files that contain the variance of the search term represented by the data structure.

26. The system of claim 25, wherein the operations further comprise presenting to a client one or more item identifiers obtained from the one or more postings list, the item identifiers identifying one or more files that contain the variance of the search term represented by the data structure.

27. The system of claim 25, wherein a key is derived from International Component Unicode (ICU) representing a character in the different language locales.

28. A non-transitory machine-readable medium having instructions stored therein, which when executed by a processor, cause the processor to perform operations for indexing, the operations comprising:
receiving a first search term at a data processing system, the first search term having a plurality of characters to be indexed;
determining a current language locale of the data processing system;
building a data structure having a plurality of nodes based on the first search term, each of the nodes representing one of the characters in the first search term, wherein the data structure includes at least two node corresponding to different characters that have an identical meaning under the current language locale;
traversing each node of the data structure to identify one or more postings lists of an index corresponding to the plurality of nodes of the data structure; and
determining a key for each of the characters of the first search term under the current language locale;
indexing the key for each of the characters of the first search term in the index without indexing based on actual characters of the first search term, the key representing a family of a plurality of equivalent characters having an identical meaning under the current language locale, wherein the index is used for subsequent searches based on keys,
wherein traversing the data structure comprises:
matching a first key of each node of the data structure against a second key of a corresponding character of the search term,
removing from the data structure a character candidate having the key that does not match the second key, and
returning to the client one or more item identifiers obtained from the one or more postings list, the one or more item identifiers identifying one or more files that contain the variance of the search term represented by the data structure.

29. The non-transitory machine-readable medium of claim 28, wherein the operations further comprise:
receiving at the data processing system a search query having a second term from a client, the second term having one or more characters;
generating a sequence of one or more keys representing each of the characters based on the current language locale;
searching the index based on the sequence of one or more keys to identify one or more postings lists associated with the keys; and
returning to the client a list of one or more item identifiers obtained from the postings lists, the one or more item identifiers identifying one or more files that contain characters corresponding to the keys.

30. The non-transitory machine-readable medium of claim 28, wherein the key is derived from International Component Unicode (ICU) representing a character in the different language locales.

31. A data processing system, comprising:
a processor; and
a memory coupled to the processor to store instructions, which when executed from the memory, cause the processor to perform operations for indexing, the operations including
receiving a first search term at a data processing system, the first search term having a plurality of characters to be indexed;
determining a current language locale of the data processing system;
building a data structure having a plurality of nodes based on the first search term, each of the nodes representing one of the characters in the first search term, wherein the data structure includes at least two node corresponding to different characters that have an identical meaning under the current language locale;
traversing each node of the data structure to identify one or more postings lists of an index corresponding to the plurality of nodes of the data structure; and
determining a key for each of the characters of the first search term under the current language locale;
indexing the key for each of the characters of the first search term in the index without indexing based on actual characters of the first search term, the key representing a family of a plurality of equivalent characters having an identical meaning under the current language locale, wherein the index is used for subsequent searches based on keys,
wherein traversing the data structure comprises:
matching a first key of each node of the data structure against a second key of a corresponding character of the search term,
removing from the data structure a character candidate having the key that does not match the second key, and
returning to the client one or more item identifiers obtained from the one or more postings list, the one or more item identifiers identifying one or more files that contain the variance of the search term represented by the data structure.

32. The system of claim 31, wherein the operations further comprise:
- receiving at the data processing system a search query having a second term from a client, the second term having one or more characters;
- generating a sequence of one or more keys representing each of the characters based on the current language locale;
- searching the index based on the sequence of one or more keys to identify one or more postings lists associated with the keys; and
- returning to the client a list of one or more item identifiers obtained from the postings lists, the one or more item identifiers identifying one or more files that contain characters corresponding to the keys.

33. The system of claim 31, wherein the key is derived from International Component Unicode (ICU) representing a character in the different language locales.

* * * * *